Patented Nov. 8, 1949

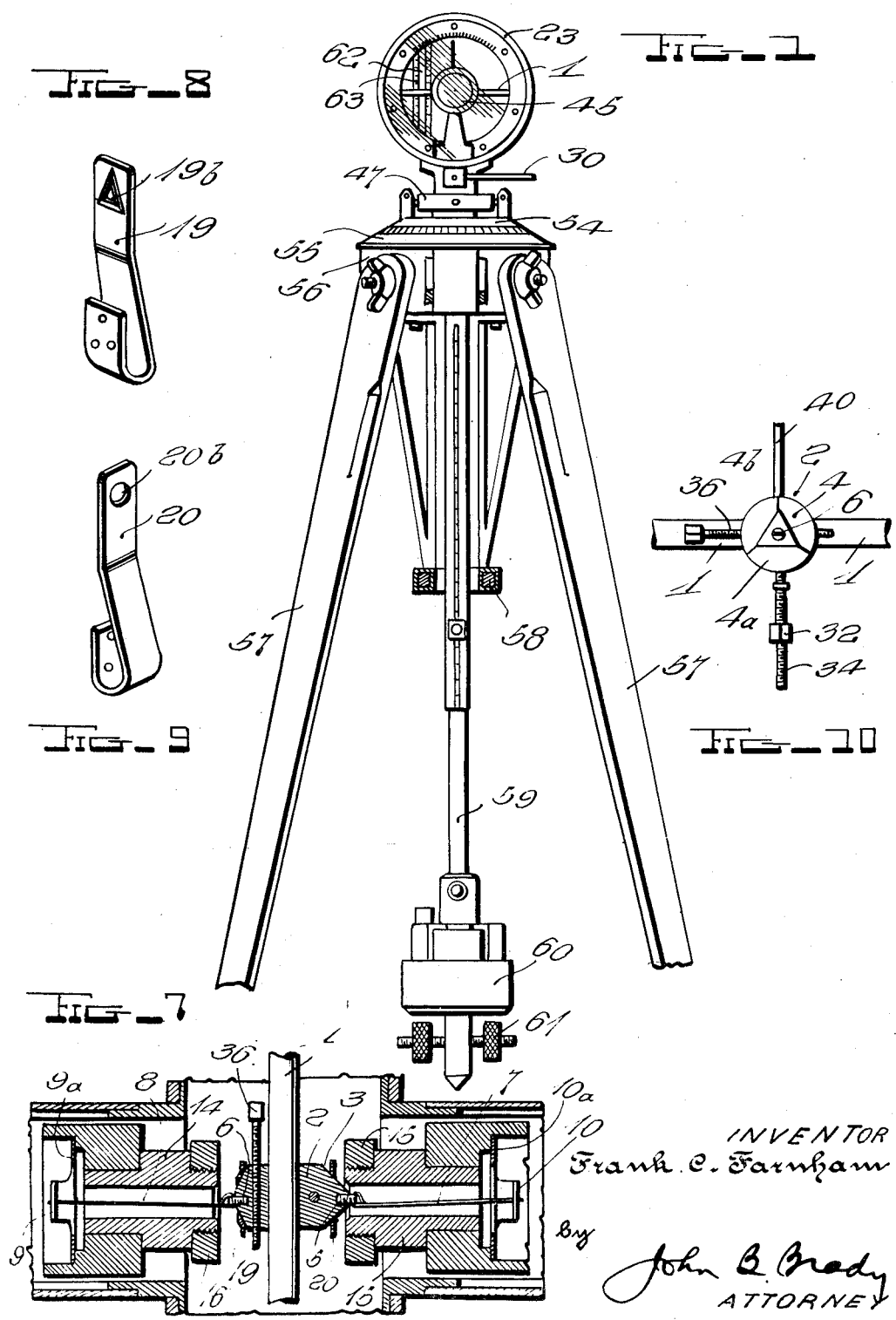

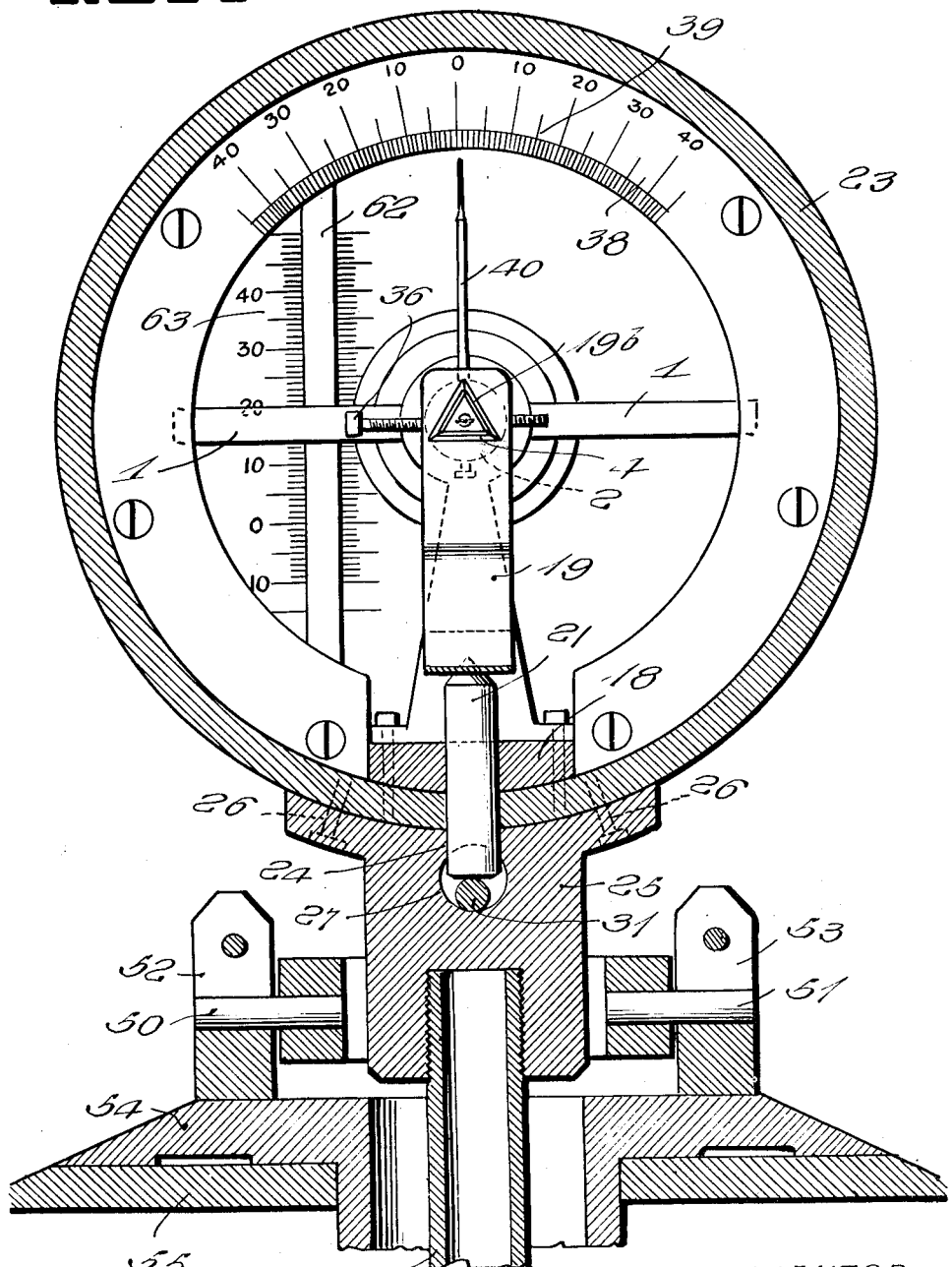

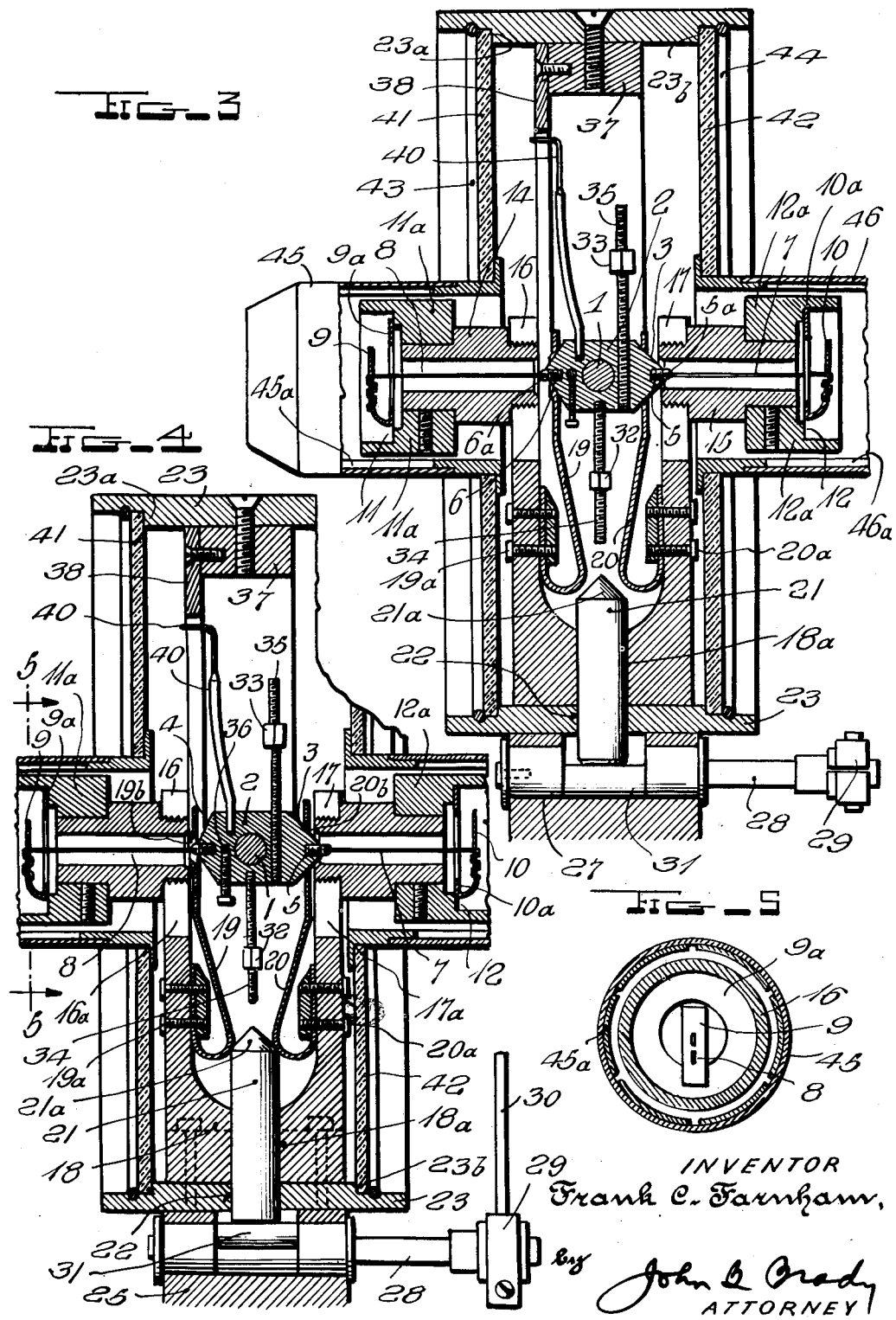

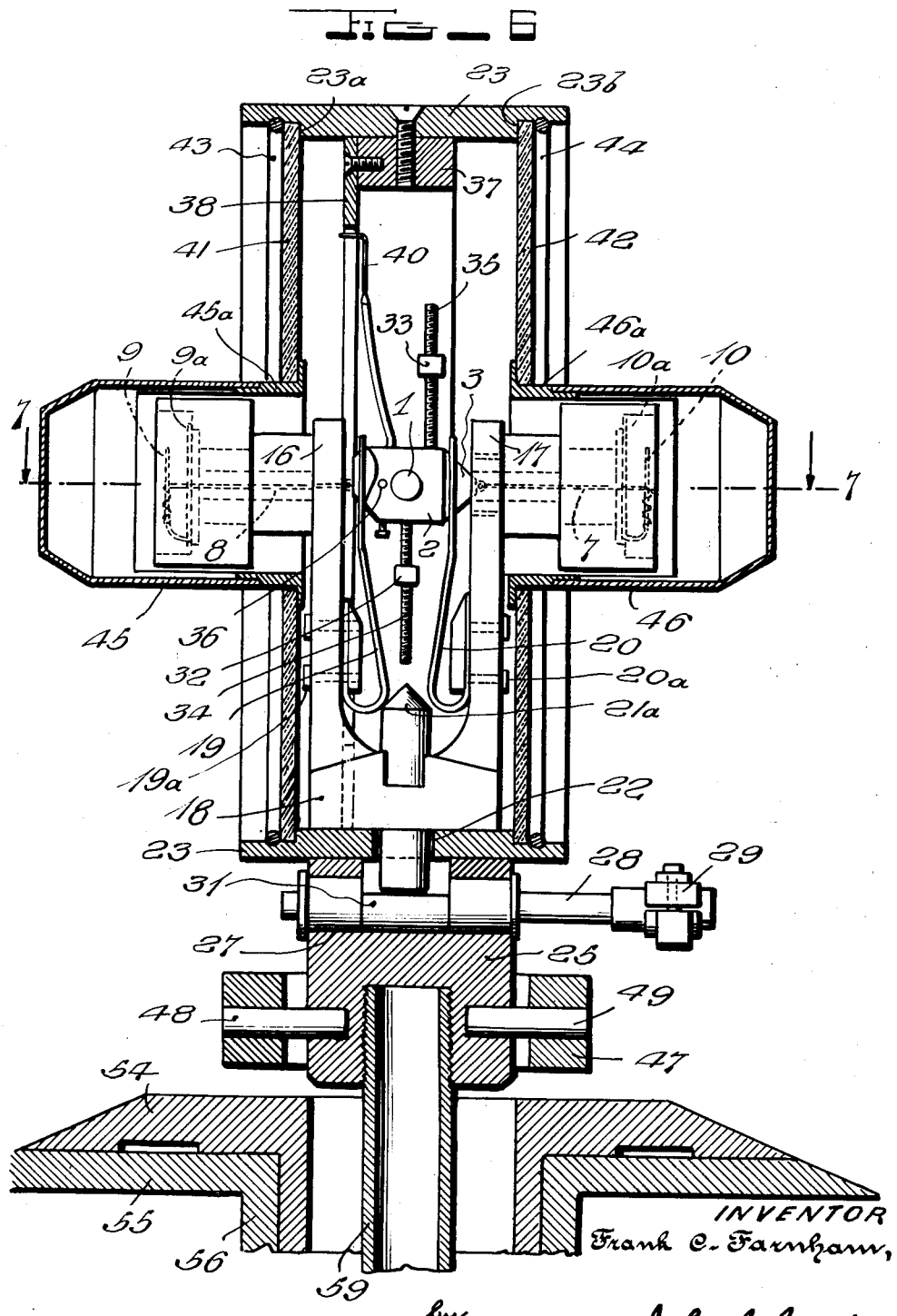

2,487,047

UNITED STATES PATENT OFFICE 2,487,047

ELASTIC SUSPENSION AND RESILIENT MOUNTING MEANS FOR MAGNETIC SYSTEMS

Frank C. Farnham, Baltimore, Md.

Application November 12, 1947, Serial No. 785,410

8 Claims. (Cl. 175—183)

My invention relates broadly to magnetic measuring instruments and more particularly to an improved construction of magnetometer for measuring magnetic fields of ore bodies, geological bodies and structures, crystalline basements and other sources of magnetic anomalies.

One of the objects of my invention is to provide an improved construction of precision instrument for measuring magnetic fields.

Another object of my invention is to provide a construction of elastic suspension for the movable element of a magnetic measuring instrument.

Still another object of my invention is to provide an arrangement of fiber-like suspension means for the angularly movable magnetic element of a magnetometer including a resilient means for normally clamping the magnetic element in fixed position when the instrument is to be transported to a location at which a magnetic survey is to be made.

Still another object of my invention is to provide a construction of magnetic indicating element for magnetometers, including means for counterbalancing the indicating element for predetermined adjustment thereof with respect to a calibrated scale.

A still further object of my invention is to provide a construction of angularly movable indicator system for magnetometers including an arrangement of counterweights adjustable to improve the sensitivity of the indicator system by adjusting both elastic torque and gravitational torque.

Still another object of my invention is to provide an improved construction of indicator mechanism for magnetometers, as set forth more fully in the specification hereinafter following by referring to the accompanying drawings, in which:

Figure 1 is a front elevational view of a magnetometer embodying my invention; Fig. 2 is an enlarged front elevational view of the magnetometer of my invention with certain of the parts illustrated in vertical section; Fig. 3 is a vertical sectional view taken through the magnetometer and illustrating the movable indicating element in clamped position therein; Fig. 4 is a view similar to the view illustrated in Fig. 3 but illustrating the movable element of the magnetometer in released position ready for a reading; Fig. 5 is a vertical sectional view taken on line 5—5 of Fig. 4; Fig. 6 is a side elevational view of the indicating system of the magnetometer showing certain of the parts in vertical section; Fig. 7 is a horizontal sectional view taken on line 7—7 of Fig. 6; Fig. 8 is a perspective view of one of the spring clamps associated with one end of the angularly movable indicator system; Fig. 9 is a perspective view of the spring clamp which is associated with the other end of the angularly movable indicating system in the magnetometer of my invention; and Fig. 10 is an end view of the magnetic element constituting the part of the angularly shiftable indicating mechanism employed in the structure of my invention.

My invention is directed to the precision suspension of the magnetic indicating element of an instrument for measuring magnetic fields. I provide an elastic suspension for an angularly shiftable indicating element of a magnetometer by which the mass of the balanced system is properly distributed. The elastic suspension is constructed of sufficient strength and practical length so that the instrument is fieldworthy. The angularly shiftable magnet element is provided with adjustable counterweights for compensating for counterclockwise gravitational torque and clockwise magnetic torque for increasing the sensitiveness of the indicating system. A fiber suspension means is employed for the angularly shiftable balanced magnetic system where the suspension means is resiliently supported at opposite ends thereof. The magnetometer of my invention has been found to be very efficient in operation.

The counterweight is so adjusted that the counterclockwise gravitational torque exerted by it is equal to the clockwise magnetic torque upon the magnetic element at a place where the vertical component of the earth's magnetic field is normal, and the fiber is adjusted so that the resultant elastic torque on the element is zero when it is horizontal. Now, if the system is displaced clockwise through a small angle it will be subject to two torques, the elastic torque of the fiber which tends to return it to its original position and the gravitational torque on the sensitivity adjustment weight which tends to displace it further. If the elastic torque is greater than the gravitational torque, the system will be stable and return to its original position. Since the resultant torque tending to return the system to its undeflected position is the difference between the elastic and gravitational torques, the system can be adjusted to have as high a sensitivity as desired by making the difference sufficiently small, this in spite of the fact that the elastic torque may be rather large. Although the above discussion applies to a vertical field balance, the same principle applies to a horizontal field balance. By this means the use of strong, short suspensions in magnetic field balances is made practical.

Referring to the drawings in detail, reference character 1 designates the magnetic needle which passes through the central magnetic hub-like member 2. The hub-like member 2 is frusto-conically shaped on one end as represented at 3, and on the other end there are a multiplicity of flat angularly disposed plane faces represented at 4, 4a, and 4b, as shown more particularly in Fig. 10. The central, magnetic hub-like member 2 has plug members 5 and 6 screw-threaded into the apexes of the opposite ends thereof. These screw-threaded plugs 5 and 6 are each provided with eyelets 5a and 6a through which the ends of the fibers 7 and 8 are threaded and fastened. Fibers 7 and 8 are formed from elastic material of considerable strength and are secured at the outer ends thereof by two leaf springs represented at 9 and 10. The leaf springs 9 and 10 are tongue-like members which extend from circular frame-like portions 9a and 10a which are seated within the annular recesses 11 and 12 of cylindrical members 11a and 12a. The cylindrical members 11a and 12a are both centrally apertured for the passage of the ends of tubular members 14 and 15. The tubular members 14 and 15 extend into the opposite poles 16 and 17 of the U-shaped magnetic frame 18 and are screw-threaded therein to form cylindrical protective housings through which the fiber thread-like members 7 and 8 extend. The ends of the pole pieces 16 and 17 are split, as represented at 16a and 17a, to impart resilience thereto and facilitate the introduction of the members 14 and 15 into the pole pieces 16 and 17.

The central hub-like member 2, which is resiliently suspended for rotary movement on the fibres 7 and 8, is arranged with relation to a pair of resilient confining arms represented at 19 and 20. The arms 19 and 20 are secured at 19a and 20a to the inner faces of the substantially parallel extending portions 16 and 17 and are each apertured as represented more clearly in Figs. 8 and 9 to conform with the shapes of the opposite ends of the hub-like member 2. That is to say, the resilient confining arm 19 is apertured adjacent its extremity, as represented at 19b in a substantially polygonal shape to conform with the shapes of the faces 4 at one of the hub-like members 2 as represented in Fig. 8. The resilient strip 20 is shown in Fig. 9 with an aperture 20b adjacent the end thereof operative to engage the frusto-conical shaped end 3 of the hub-like member 2. Thus the confining arms 19 and 20 serve to support the central magnetic hub-like member 2 while the instrument is not in use or while the instrument is being transported from place to place for protecting the delicate mechanism of the magnetometer. When the instrument is to be placed in use the confining arms 19 and 20 are spread away from opposite ends of the central magnetic hub-like member 2 for releasing the central hub-like member 2 and allowing axial movement thereof about the axis of the thread-like suspensions 7 and 8.

It will be observed that the confining arms 19 and 20 are substantially flat strip-like members which occupy a minimum amount of space between the inner faces of the parallel extending portions 16 and 17 and the ends of the hub-like member 2. These confining arms 19 and 20 have sufficient movement to engage or disengage the shaped ends of the hub-like member 2. This displacement is effected by operation of a plunger 21 having a frusto-conical head 21a adapted to enter the space between the resilient confining arms 19 and 20 for displacing said arms from the position illustrated in Fig. 3 to the position illustrated in Fig. 4. This action results in a release of the ends of the magnetic hub-like member 2 which functions as an armature between the pole pieces 16 and 17.

The U-shaped magnetic frame 18 is apertured at 18a to permit the upward and downward movement of plunger 21. The aperture 18a is aligned with a corresponding aperture 22 in the circular frame structure 23 which is similarly aligned with the aperture 24 in the supporting member 25. The supporting member 25 is connected through suitable attachment screws 26 with the circular frame structure 23. Aperture 24 in supporting member 25 terminates in the transverse aperture 27 extending through supporting member 25. A horizontally extending actuating member 28 extends through aperture 27 in supporting member 25 and is revolvable under control of the manual hand grip 29 and lever 30. An eccentric portion 31 on member 28 engages the end of plunger 21 for raising or lowering the plunger 21. The plunger is displaced from the position illustrated in Fig. 3 to the position illustrated in Fig. 4 in order to unlatch the movable armature 2 from its protective inoperative position to its operative position.

Armature 2 has associated therewith the counter-balance weights constituted by adjustable nut members 32 and 33 which are movable on screw-threaded members 34 and 35 for dynamically balancing the armature 2 about the axis constituted by thread-like suspension means 7 and 8. In addition to the counterbalance thus provided, we also provide a fine adjustment mass compensating means in the form of an adjusting screw 36 adjustable diametrically through the armature 2.

The armature 2 carries the magnetic needle 1 which is operative within the magnetic member 37 secured within the circular frame 23. The magnetic member 37 has a scale 38 associated therewith, the scale being suitably calibrated as represented at 39 and coacting with the indicator 40 carried by the armature 2.

The housing formed by the circular frame 23 is completed by circular end plates 41 and 42 which are secured within the circular frame 23 by resilient ring members 43 and 44 against abutments formed by annular shoulders 23a and 23b within the circular frame 23.

The end plates 41 and 42 are both formed from transparent material in order to permit observation of the operation of the instrument. Plate members 41 and 42 each carry the projecting cover members 45 and 46 respectively. Cover members 45 and 46 are each removable from sleeve members 45a and 46a carried by the plate members 41 and 42 to permit access to the resilient supports 9 and 10 for insuring proper maintenance of the apparatus in the field.

The supporting member 25 is mounted in a trunnion-like ring device 47 connected through pins 48 and 49 with the supporting member 25 and through pins 50 and 51 with the vertically extending supports 52 and 53 mounted upon the rotatable member 54 of the supporting tripod platform 55. The supporting tripod platform 55 is connected with a tripod frame 56 to which the adjustable tripod supporting legs 57 are adjustably connected. The tripod frame 56 includes a depending frame portion 58 associated therewith through which the pendulum-like depending member 59 extends for suspending the magnetic compass and level device 60. Suitable counter-balance means 61 are associated with the magnetic compass and level 60 as represented more particularly in Fig. 1.

A thermometer 62 is positioned within the housing frame by circular frame 23 and is provided with temperature scale 63 which is readily readable through the transparent sides 41 and 42 of the housing.

The shaping of the opposite ends of the armature 2 to enable these ends to be gripped by the shaped ends of the resilient arms 19 and 20 is an important feature of my invention. The fiber-like suspension of the armature 2 by members 7 and 8 connected to resilient means 9 and 10 is also of prime importance in the successful operation of the apparatus of my invention.

While I have described my invention in certain preferred embodiments I realize that modifications may be made and no limitations upon my invention are intended other than may be imposed by the scope of the appended claims.

What I claim as new and desire to secure by Letters Patent of the United States is as follows:

1. A magnetometer comprising a frame structure, a scale carried by said frame structure, a permanent magnet disposed within said frame structure and terminating in a pair of substantially parallel pole pieces, a tubular member carried by each of said pole pieces, an armature member arranged between said pole pieces, a thread-like suspension connected with opposite ends of said armature member and extending through said tubular member, resilient means carried by said frame structure for supporting the ends of said thread-like suspensions, an indicator carried by said armature member and coacting with the scale on said frame structure and means for resiliently gripping said armature member in a fixed position against rotation.

2. A magnetometer comprising a frame structure, a scale carried by said frame structure, a permanent magnet disposed within said frame structure and terminating in a pair of substantially parallel pole pieces, a tubular member carried by each of said pole pieces, an armature member arranged between said pole pieces, a thread-like suspension connected with opposite ends of said armature member and extending through said tubular member, resilient means carried by said frame structure for supporting the ends of said thread-like suspensions, an indicator carried by said armature member and coacting with the scale on said frame structure, resilient means disposed between the ends of said armature member and said permanent magnet and operative to normally support said armature member against angular movement and means for displacing the aforesaid means for releasing said armature member for permitting angular movement thereof under control of magnetic variations.

3. A magnetometer comprising a frame structure, a circular magnet and scale housed within said frame structure, a U-shaped permanent magnet extending through one side of said circular magnet into said frame structure and terminating in substantially parallel pole faces centrally of said frame structure, tubular members supported by each of said pole faces and projecting axially in opposite directions from said frame structure, an armature member disposed between said pole faces, fibre-like members extending from opposite ends of said armature member through said tubular members and secured to said frame structure for suspending said armature member for angular movement, an indicator extending from said armature member and coacting with said scale and a magnetic needle carried by said armature member and movable in an angular path extending through said circular magnet.

4. A magnetometer comprising a frame structure, a circular magnet and scale housed within said frame structure, a U-shaped permanent magnet extending through one side of said circular magnet into said frame structure and terminating in substantially parallel pole faces centrally of said frame structure, tubular members supported by each of said pole faces and projecting axially in opposite directions from said frame structure, an armature member disposed between said pole faces, fibre-like members extending from opposite ends of said armature member through said tubular members and secured to said frame structure for suspending said armature member for angular movement, an indicator extending from said armature member and coacting with said scale, a magnetic needle carried by said armature member and movable in an angular path extending through said circular magnet and means for locking and/or unlocking said armature member in a fixed or freely movable suspended position between said pole faces.

5. A magnetometer comprising a frame structure, a circular magnet and scale housed within said frame structure, a U-shaped permanent magnet extending through one side of said circular magnet into said frame structure and terminating in substantially parallel pole faces centrally of said frame structure, tubular members supported by each of said pole faces and projecting axially in opposite directions from said frame structure, an armature member disposed between said pole faces, fibre-like members extending from opposite ends of said armature member through said tubular members and secured to said frame structure for suspending said armature member for angular movement, an indicator extending from said armature member and coacting with said scale, a magnetic needle carried by said armature member and movable in an angular path extending through said circular magnet and means carried by said frame structure for enclosing said tubular members and the connections of said fibre-like members with said frame structure.

6. In a magnetometer, a magnetic frame structure terminating in a pair of spaced substantially parallel pole faces, tubular members projecting from each of said pole faces, a magnetic armature member having a frusto-conical terminus at one end and a polygonally shaped terminus at the other end, fibre-like members connected with opposite ends of said armature and extending through said tubular members and resiliently secured to said frame structure and means disposed between said pole faces and the ends of said armature member for resiliently engaging or disengaging the frusto-conically and polygonally shaped termini of said armature member.

7. In a magnetometer, a magnetic frame structure terminating in a pair of spaced substantially parallel pole faces, tubular members projecting from each of said pole faces, a magnetic armature member having a frusto-conical terminus at one end and a polygonally shaped terminus at the other end, fibre-like members connected with opposite ends of said armature and extending through said tubular members and resiliently secured to said frame structure, a resilient strip member individual to each of said pole faces, one of said resilient strips having a circular aperture therein operative to engage the frusto-conically shaped terminus of said armature and the other of said resilient strips having a polygonally shaped aperture therein operative to engage the polygonally shaped terminus of said armature member and means for controlling the position of said resilient strip members to effect an engagement or disengagement of said strip members with the termini of said armature member for locking or unlocking said armature member with respect to said pole faces.

8. In a magnetometer, a magnetic frame structure terminating in a pair of spaced substantially parallel pole faces, tubular member projecting from each of said pole faces, a magnetic armature member having a frusto-conical terminus at one end and a polygonally shaped terminus at the other end, fibre-like members connected with opposite ends of said armature and extending through said tubular members and resiliently secured to said frame structure, a resilient strip member individual to each of said pole faces, one of said resilient strips having a circular aperture therein operative to engage the frusto-conically shaped terminus of said armature and the other of said resilient strips having a polygonally shaped aperture therein operative to engage the polygonally shaped terminus of said armature member, means for controlling the position of said resilient strip members to effect an engagement or disengagement of said strip members with the termini of said armature member for locking or unlocking said armature member with respect to said pole faces and adjustable means extending from said armature member for counterbalancing the angular movement of said armature member.

FRANK C. FARNHAM.

REFERENCES CITED

The following references are of record in the file of this patent:

UNITED STATES PATENTS

| Number | Name | Date |
|---|---|---|
| 1,701,603 | Bauer et al. | Feb. 12, 1929 |
| 1,702,868 | Hotchkiss et al. | Feb. 19, 1929 |
| 1,909,619 | Herrick | May 16, 1933 |
| 2,010,245 | Roux | Aug. 6, 1935 |
| 2,362,616 | Cloud | Nov. 14, 1944 |